INVENTOR.
JAMES W. DIBRELL
BY Campbell, Brumbaugh, Free & Graves
HIS ATTORNEYS.

INVENTOR.
JAMES W. DIBRELL
BY
Campbell, Brumbaugh, Free & Graves
HIS ATTORNEYS

Aug. 23, 1955 J. W. DIBRELL 2,716,047

STATISTICAL FREQUENCY DISTRIBUTION RECORDER

Filed April 3, 1951 8 Sheets-Sheet 3

INVENTOR.
JAMES W. DIBRELL
BY
Campbell, Brumbaugh, Free & Graves
HIS ATTORNEYS

STATISTICAL FREQUENCY DISTRIBUTION RECORDER

Filed April 3, 1951 8 Sheets-Sheet 4

INVENTOR.
JAMES W. DIBRELL
BY Campbell, Brumbaugh, Free & Graves
HIS ATTORNEYS

INVENTOR.
JAMES W. DIBRELL
BY
Campbell, Brumbaugh, Free & Graves
HIS ATTORNEYS

Aug. 23, 1955 J. W. DIBRELL 2,716,047

STATISTICAL FREQUENCY DISTRIBUTION RECORDER

Filed April 3, 1951 8 Sheets-Sheet 6

INVENTOR.
JAMES W. DIBRELL
BY
Campbell, Brumbaugh, Free & Graves
HIS ATTORNEYS

INVENTOR.
JAMES W. DIBRELL
BY
Campbell, Brumbaugh, Free & Graves
HIS ATTORNEYS

Aug. 23, 1955 J. W. DIBRELL 2,716,047

STATISTICAL FREQUENCY DISTRIBUTION RECORDER

Filed April 3, 1951 8 Sheets-Sheet 8

INVENTOR.
JAMES W. DIBRELL
BY Campbell, Brumbaugh, Free, and Graves
HIS ATTORNEYS

United States Patent Office 2,716,047

Patented Aug. 23, 1955

2,716,047

STATISTICAL FREQUENCY DISTRIBUTION RECORDER

James W. Dibrell, New York, N. Y., assignor to Ebasco Services, Inc., New York, N. Y., a corporation of New York Application April 3, 1951, Serial No. 218,955

18 Claims. (Cl. 346—33)

This invention relates to frequency distribution recorder apparatus particularly adapted for registering and periodically recording events for purposes of statistical analysis and the like.

In the copending application, Serial No. 55,296 entitled "Statistical Frequency Distribution Recorder" filed October 19, 1948, and of which this application is a continuation-in-part, there is disclosed an apparatus particularly adapted for making statistical surveys and comprising cooperative and interrelated counter, recorder and timer components arranged in a unified assembly and operable to provide permanent records over long time intervals of frequency distribution of discrete events which may occur periodically over wide frequency ranges. Also the apparatus is designed according to the invention so as to be readily adaptable for use successively at different locations whereat the installation facilities and motions to be analyzed are widely varied. The present invention affords numerous improvements throughout the system, incorporating also the basic features of the pending application.

It is accordingly one object of this invention to provide improved meter and recorder apparatus by means of which accurate statistical analyses of frequency distribution may be made.

Another object of the invention is to provide new and improved meter and recorder apparatus whereby the frequency distribution may be recorded based upon any one of a plurality of adjustable time intervals.

It is another object of the invention to provide an improved focusing mechanism for use in bringing a scanning assembly into fine adjustment in order that the system may be made responsive, for example, to the aperiodic motions of relatively small elements.

It is another object of the invention to provide improved counter actuating mechanism operable as part of a system of the character described whereby the input energy to the counter device per se is made constant and independent of variations in the magnitude of the primary or intermediate driving sources.

Yet another object of the invention is to provide an improved mechanism for resetting the counter to an initial value, which resetting operation may be under the control of or modified by another component of the system such as the recording mechanism, for example.

Another object of the invention is to provide an improved closely calibrated mechanical linkage for modifying the motion between two points within closely defined tolerances whereby the necessity for maintaining extremely close tolerances in the manufacture is obviated.

Another object of the invention is the provision of a fast-acting, highly simplified magnetic clutch assembly for use in establishing unidirectional movements within the system.

Still another object of the invention is to provide an adjustable timing apparatus for controlling the operation of the system and which may be easily and conveniently adjusted to suit the requirements of the particular statistical analysis undertaken.

These as well as other objects and advantages of the invention which will appear from the accompanying description of a preferred system formed according to the invention are attained by means of a unified system which may include, for example, a focusing assembly through which a beam of light passes from a source to the path of movement of particular objects, indicia or the like which move as a function of the variable to be analyzed. Thus the movement of the usual black mark at the periphery of the rotary disc of a watt-hour meter may be utilized as the object of focus of the light. Alternatively the movements of a series of objects or of the same object over a switch mechanism may be used in lieu of the light system. The interrupted or reflected light, or other input signal, is utilized to pulse an electrical circuit which in turn energizes a counter. A printing system is utilized in conjunction with the counter for recording the total count reached in each preestablished time interval, which time interval may be varied according to the invention hereinafter disclosed. Timing control apparatus is incorporated into the system to reset the counter after each record is made, and the printing, counting and resetting operations are preferably functionally and mechanically interrelated so as to afford the proper operational sequences and to prevent mutual interference of the sequential operations.

The invention may be better understood from the following description thereof taken in conjunction with the accompanying drawings, in which.

Figures 1, 2, 3, 4, 5:
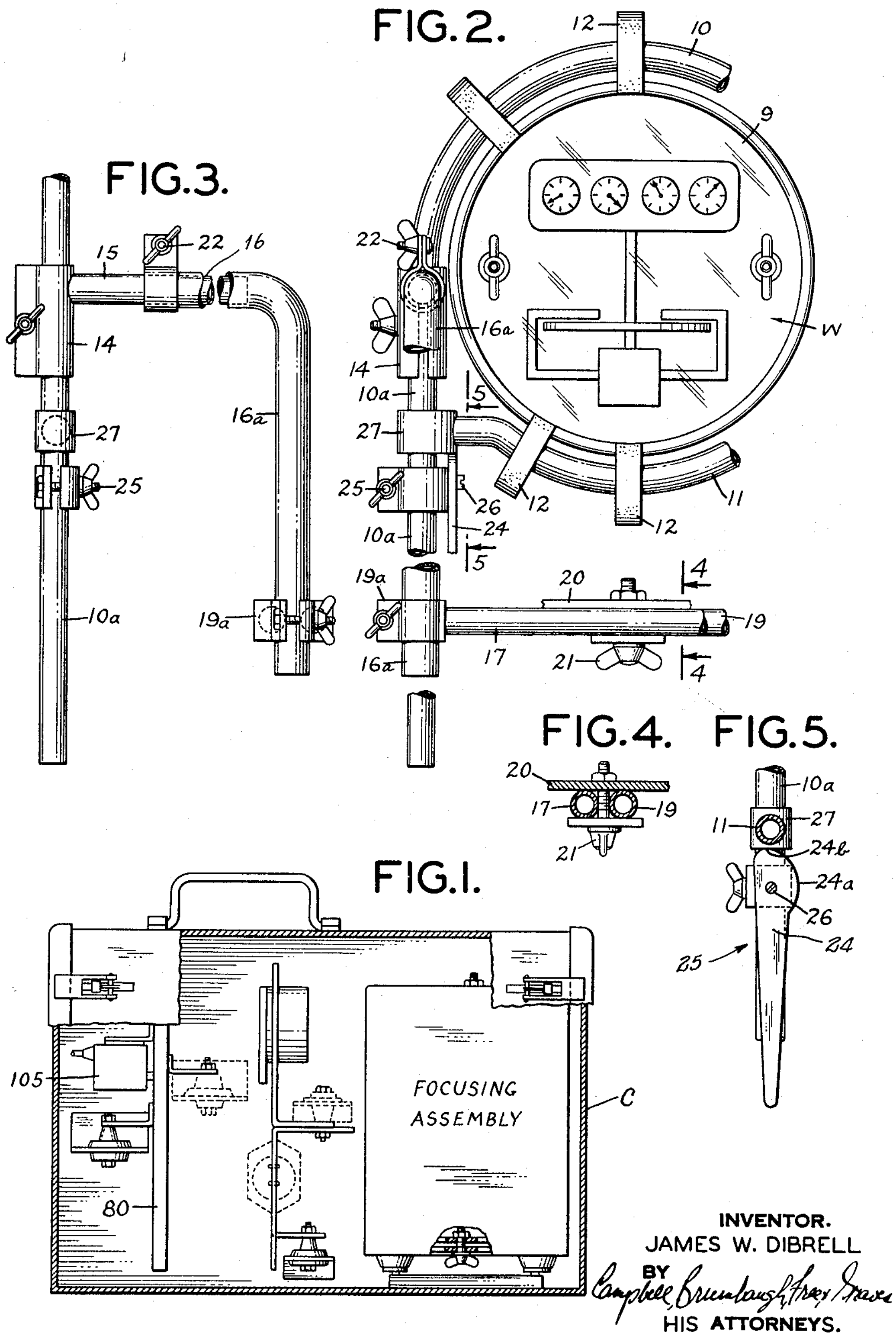
Fig. 1 is a side view partially in section of a typical portable carrying case for a device constructed according to the invention.
Fig. 2 is a front view of a typical watt-hour meter showing the mounting assembly for the device of this invention clamped thereto, the mounting assembly as shown being partially broken away to reveal certain operative parts thereof.
Fig. 3 is a view in side elevation of the supporting and focusing assembly of Figure 2.
Fig. 4 is a view in section taken on the line 4—4 of Figure 2 looking in the direction of the arrows.
Fig. 5 is a fragmentary view of the clamp arrangement used on the mounting assembly of Figure 2 taken on the lines 5—5 and looking in the direction of the arrow.

Referring to the drawings and more particularly to Figures 1–5 thereof, the invention is illustrated in a form for use with a watt-hour meter W (Figure 2), the invention being utilized in this case to respond to the rotations of the disc D, which is incorporated in meters of this type.

For convenience the several component parts of the instrument are described below under appropriate subheadings as follows:

I.—Mounting assembly for supporting instrument;
II.—Scanner assembly and fine focusing mechanism;
III.—Counting mechanism responsive to signals from the scanner;
IV.—Printing mechanism for recording accumulated count at preestablished intervals;
V.—Timing mechanism for controlling the printing mechanism;
VI.—Mechanism for resetting the counter
VII.—Electrical system for energizing and coordinating the component parts of the instrument.

This division is made solely for ease of description, it being understood that each component is an essential element of the combination and is necessary in the relationship described to obtain the object of the invention and the over-all results from its use.

I. *Mounting assembly for supporting instrument*

Shown in Figure 1 is a typical carrying case C within which the device of the present invention may be conveniently carried. Conventional shock mounts may be used to support the instrument in the case, or alternatively a simple slide assembly (not shown) may be used. Figs. 2–5 show a mounting mechanism or carriage for positioning the focusing assembly in front of the watt-hour meter, affording convenient vertical and horizontal adjustment as described below. The structure of the mounting assembly is generally similar on either side of the watt-hour meter and the following description of one of the companion parts should suffice.

The mounting mechanism comprises essentially split rings 10 and 11 having rubber cleats 12 fitted thereon and adapted to embrace thee glass, plastic or metal cover 9 of the watt-hour meter W. The split ring 10 is formed with a vertical extension 10*a* which a joint member 27 of the ring 11 is slidable. A cam 24 is mounted on a clamping member 25 by a pin 26 to increase the clamping pressure of the ring 11 against the casing of the meter. When the device is clamped to a meter casing the clamp 25 is first pushed upwardly along the vertical extension 10*a* until the rubber cleats 12 engage the periphery of the meter casing, the cam 24 being positioned so that the face 24*a* is against the joint member ber 27 so that the rubber cleats might be tightened against the meter casing when the cam is turned. Extending from the split ring 10 and held by a clamping collar 14 is an arm 15 on which a telescoping arm 16 having a clamp 22 is slidable mounted (Figure 3), the arm 16 being formed with a depending limb 16*a*. Two horizontal bars 17 and 19 are positioned on the depending limb 16*a* by clamping collar 19*a*. The focusing assembly rests on a supporting plate 20 which is attached to the bars 17 and 19 by means of a bolt and wing nut assembly 21.

The focusing assembly is approximately positioned for different distances in front of the watt-hour meter by loosening clamp members 22 and sliding the telescoping arms 15 and 16 relative to each other. The approximate vertical position of the focusing assembly in front of the meter may be adjusted by loosening the clamp 19*a* and shifting the plate and bar assembly 17—21 on the limp 16*a*. The lateral position is adjusted by loosening the nut and bolt assembly 21 and shifting the plate 20 on the bars 17 and 19.

A fine focusing assembly, designed for cooperative action with the coarse focusing arrangement set forth above, will now be described.

II.—*Scanner assembly and fine focusing mechanism*

Figure 6:
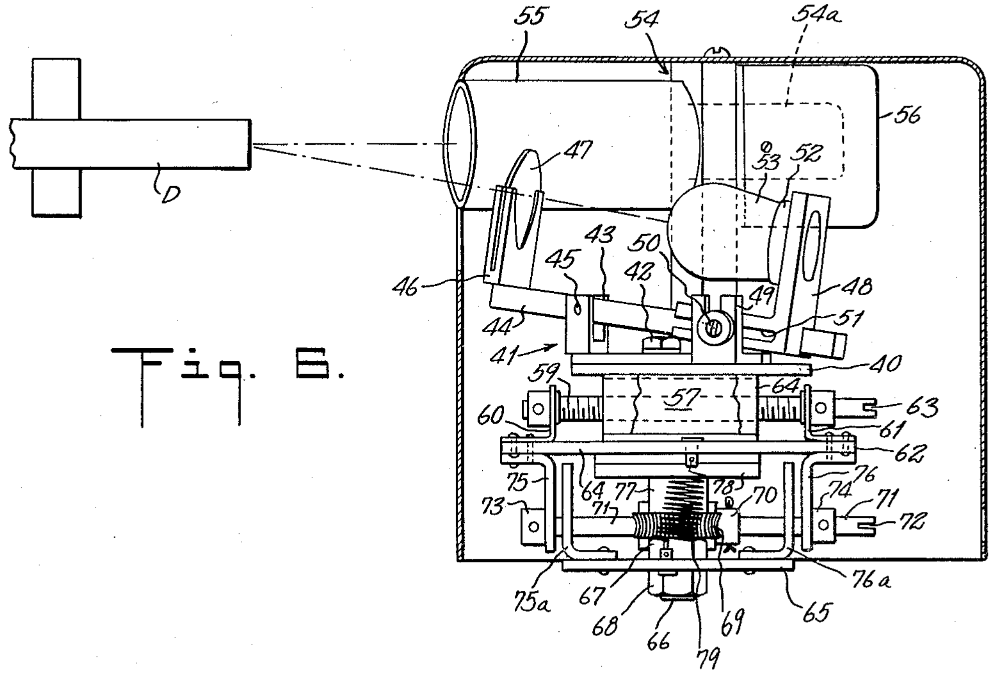
Fig. 6 is a side view of the focusing assembly with the housing being in section to show detail of structure.
Figure 7:
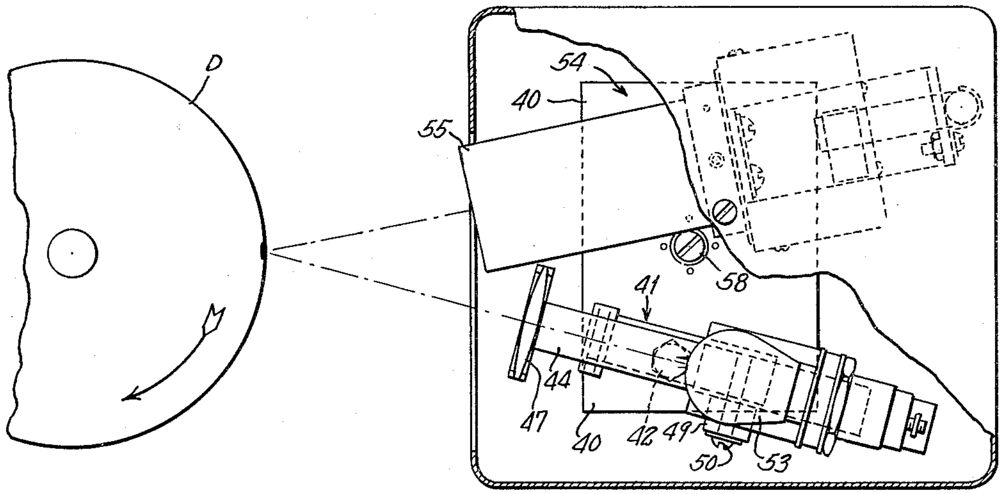
Fig. 7 is a top view of the focusing assembly of Figure 6 with the housing partly broken away to reveal the details of construction.
Figure 8:
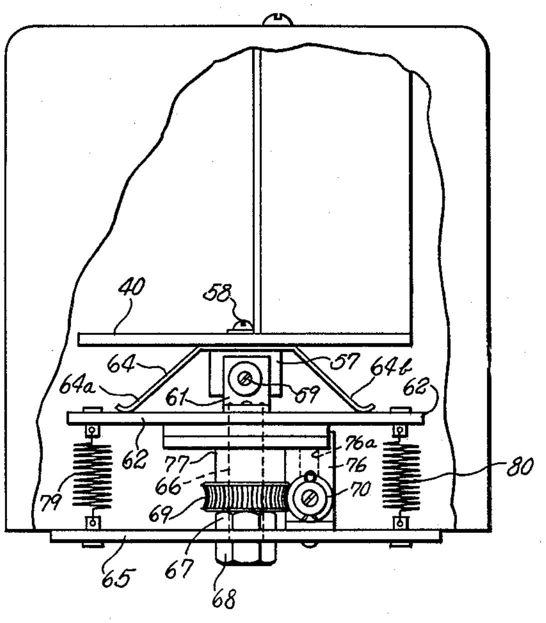
Fig. 8 is a view in elevation of the housing partially broken away to show the focusing assembly of Figure 6.

Referring to Figures 6, 7 and 8, a scanner and fine focusing assembly is shown, this assembly serving the purpose of directing a relatively high intensity beam of light with the utmost precision against the edge of the polished rotating disc D of the watt-hour meter and disposing a photoelectric tube to receive the light reflected from the disc, so that a pulse is developed each time the black mark on the periphery of the disc intercepts the light beam. The assembly comprises a top platform 40 upon which is mounted a bracket 41 for supporting a light source, the bracket being mounted by means of a bolt 42 about which it may be rotated for purposes of lateral adjustment of the beam. To the bracket 41 is attached a slotted block 43 which receives an arm 44 pivotally supported by a horizontal pin 45. The outer or left hand end of the arm 44 carries a mounting fixture 46 in which is fitted a lens 47. The inner or right hand end of the arm 44 carries a lamp bracket 48 which is slidable theron. The bracket 41 is formed with an upstanding bifurcated arm 49 which receives a screw 50 tapped into the arm 44, and by loosening the screw 50 the arm 44 may be pivoted about the horizontal pivot 45. The lamp bracket 48 is formed with a slot 51 in alignment with the arm 44 and through which the screw 50 passes so that the lamp bracket 48 may be horizontally adjustably clamped on the arm 44. The lamp bracket 48 carries a lamp socket 52 and lamp 53.

It will be seen in Figures 6 and 7 that the lamp and lens carriage is arranged so that the projected light beam is inclined slightly upwardly as well as inwardly, the latter to afford a suitable angle of incidence for the beam with respect to the periphery of the disc D.

Also carried by the table 40 is a photoelectric cell assembly 54 comprising a cylindrical light shield 55 and a housing 56 for carrying a photoelectric cell 54*a* and suitable electrical connections thereto (not shown).

Preferably the photelectric cell assembly 54 is fixed relative to the platform 40 and the necessary light focusing adjustments effected by means of the pivoted arm 44 and its movable brackets 41 and 48, the photoelectric assembly being disposed on an angle about a vertical axis corresponding to the angle of the light projector in order to receive reflected light.

The platform 40 is in turn mounted on a block 57 by means of a bolt 58. The block 57 is formed with a threaded horizontal through-bore which receives a lead-screw 59 journalled at its respective free ends in suitable bosses 60 and 61, the bosses being secured to an intermediate platform 62 (Figs. 6 and 8). A screw-driver slot 63 may be provided in one end of the lead-screw 59 by means of which the screw may be turned to shift the platform 40 forwardly or rearwardly on the platform 62. In order to constrain the upper platform 40 and block 57 against rotation about the axis of the lead-screw 59 a spring piece 64 may be interposed between the block 57 and the platform 40 with its depending edges 64*a* and 64*b* bearing downwardly against the platform 62.

The intermediate platform 62 is in turn mounted upon a stationary lower platform 65 for fine vertical adjustment relatively thereto. Vertical adjustment is effected by means of an upstanding threaded bolt 66 anchored in the platform 65 by lock nuts 67 and 68. Threaded on the vertical bolt 66 is a gear 69 which is engaged by a worm 70 turned by means of a worm shaft 71 having a screw-driver slot 72, the shaft 71 being fitted with collars 73 and 74 and journalled in suitable brackets 75 and 76 respectively depending from the intermediate platform 62. The worm shaft and intermediate platform 62 are constrained against rotation about the axis of the bolt 66 by a pair of upstanding slotted brackets 75*a* and 76*a* riveted to the stationary lower platform 65.

A bushing 77, which is slidable on the bolt 66, rests on the upper surface of the gear 69 and bears upwardly against a wear plate 78 on the underside of the intermediate platform 62. Thus by turning the worm shaft 71 the gear moves up and down, as the case may be, on the threaded bolt 66, thereby forcing the platform 62 upwardly or permitting it to be pulled downwardly by means of a pair of tension springs 79 and 80 (Fig. 8) reacting between the stationary support 65 and the platform 64. It will be seen that the worm shaft 71 moves with the shelf 62 and thus the worm 70 is maintained in driving engagement with the gear at all times.

From the foregoing it will be understood that preliminary positioning of the focusing assembly is effected by means of the mountings as shown in Figures 2–5 and that fine adjustment is then effected, as may be required, by utilizing the screw adjustments described above with reference to Figures 6–8. In the case of focusing upon the rotating disc D of the watt-hour meter the adjustments are of course critical but may be accomplished quickly and accurately by means of the structure disclosed. It will also be understood that the scanning and focusing assembly as described above may be utilized in conjunction with target means other than the rotating disc in a watt-hour meter, and that the assembly may be utilized to focus a beam of light upon a reference point, which may be disposed from approximately two inches to fifty feet from the scanner. The pulses or output signals from the photoelectric tube are then fed into a counting and recording system described below.

III.—*Counting mechanism responsive to signals from the scanner*

The counting system will be described referring in particular to Figures 9 through 12 and such other figures as may be indicated.

The pulses from the photoelectric cell 54*a* after amplification through an electric circuit, to be described later, control the energization of a solenoid 81 (Figs. 9 and 12) which actuates a counter device 82 (Fig. 11) such for example as a Veeder Root stroke counter which is operable at a relatively high rate. The driving linkage between the solenoid 81 and the counter 82 includes a micrometer adjusting transfer linkage indicated generally at 83, a magnetic clutch assembly 84, a gear train including gears 84*a*—85, 86—87 (Fig. 11) and counter input shafts 88 and 89.

Figures 9, 10:
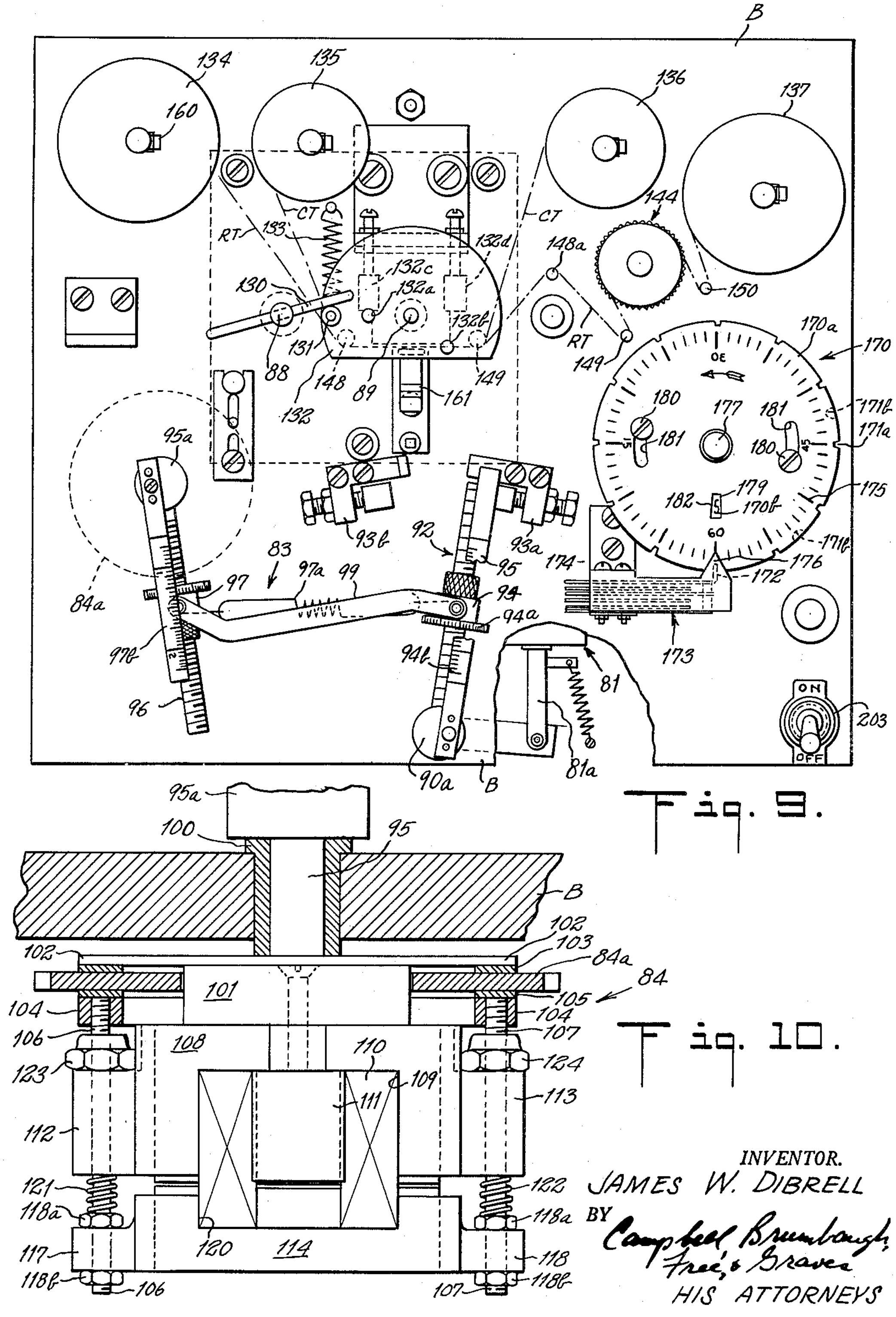
Fig. 9 is a plan view of the mechanical assembly.
Fig. 10 is a side view of a magnetic clutch assembly utilized in the counting mechanism of Figure 9.
Figure 11:
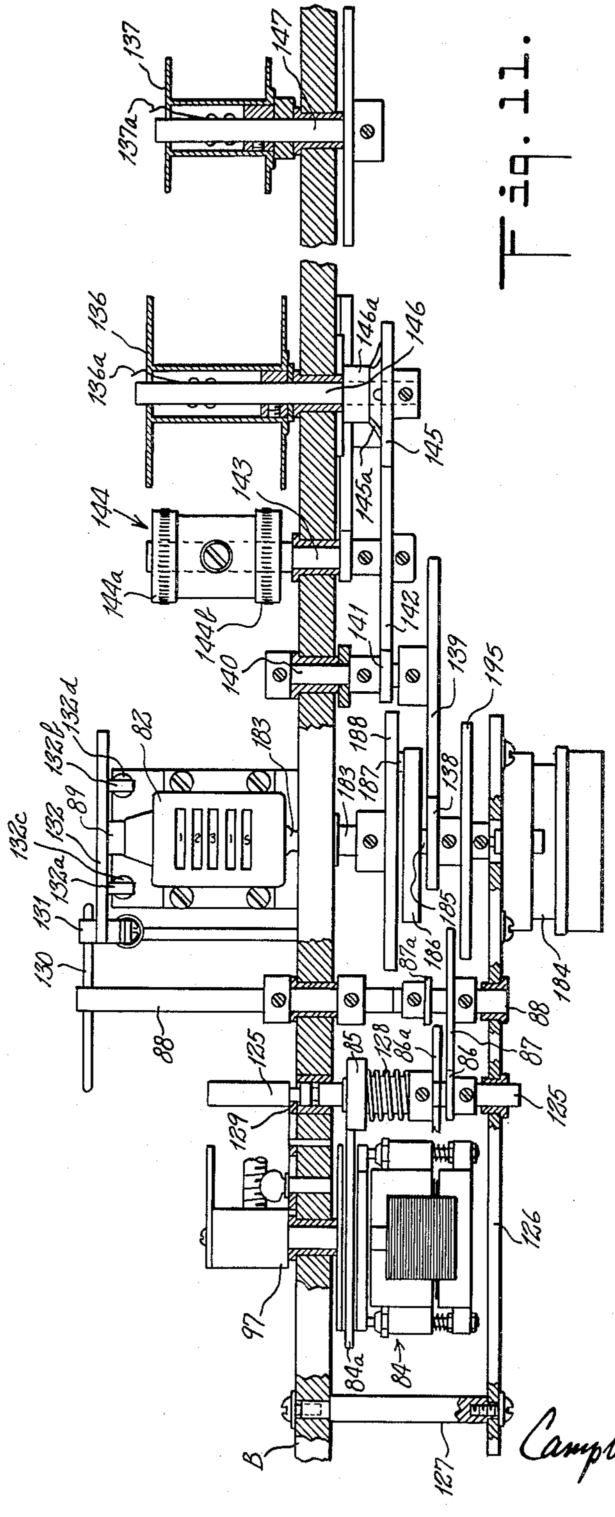
Fig. 11 is a developed side view partially in section of the mechanical assembly of Figure 9.
Figure 12:
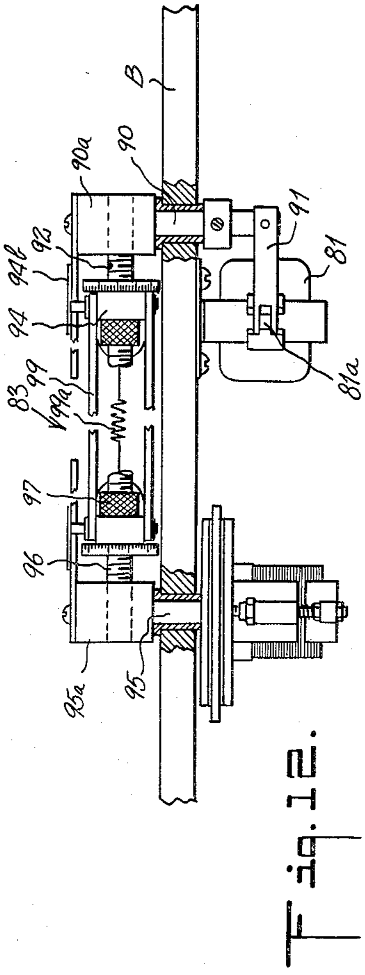
Fig. 12 is a side view of a portion of the counting mechanism looking at the mechanism from the left-hand end of Figure 11.

Referring to Fig. 9, the micrometer linkage 83 which governs the movement afforded by the solenoid 81, includes a first rock shaft 90, (Fig. 12) journaled in a base plate B and linked to the armature 81*a* of the solenoid by an arm 91. Threaded into a collar 90*a* on the rock shaft 90 is a threaded extension or radius arm 92, the free end of which may be swung between limits defined by two adjustable stops 93*a* and 93*b*. Threaded upon the arm 91 is a turning piece 94 having a vernier scale 94*a*. A calibrated scale 94*b* is affixed to the collar 94*a* to move with the arm 92, and affording a reference for the position of the turning piece 94.

A second rock shaft 95 also journaled in the base plate B and having a collar 95*a* into which is screwed a second threaded radius arm 96, is disposed near the rock shaft 90. The second arm 96 likewise is provided with a vernier turning piece 97 and a calibrated scale 97*b*, all similar to the assembly described above. Pivotally connected between each of the turning pieces 94 and 97 is a connecting link 99, whereby angular movement of the arm 92 is transmitted to the arm 96, the amount of movement transmitted being a function of the positions of the respective turning pieces 94 and 97. A nonoperating tension spring 99*a* takes up slack in the bearings over a long work life and obviates the need of close tolerances in the fabrication of the assembly.

It will be understood that the motion modifying linkage described above results in ease of adjustment as well as simplicity and decreased cost in the manufacture. It is generally the case in calibrated linkages of this type that close tolerances must be maintained throughout. In this arrangement, however, the calibrated scales 94*b* and 97*b*, for example, need not be calibrated with very close accuracy or located on the system with very close accuracy, this by virtue of the method of assembly. The rock shafts 90 and 95 with the associated vernier systems are bench assembled. The threaded radius arms 92 and 96 being turned into the collars 90*a* and 95*a* respectively to the approximate position desired and the turning pieces 94 and 97 being turned on the respective arms. The turning pieces 94 and 97 are formed with calibrated marks and are turned down on the corresponding arms until the calibration marks line up approximately against predetermined bench assembly marks which are exactly located with respect to the axes of the shafts 90 and 95. Then the arms 92 and 96 are adjusted on the shafts and the turning pieces simultaneously adjusted until the calibration marks line up exactly with the predetermined bench assembly position marks and calibration marks "zero" on the vernier scales line up exactly with the edges of the scales 94*b* and 97*b*.

The next portion of the driving linkage, as encountered proceeding from the solenoid 81 to the counter 82, is the high torque capacity, fast acting magnetic clutch 84, as best seen in Fig. 10. The clutch assembly is carried by the rock shaft 95 which is journaled in the base plate B in a bearing bushing 100. A hub portion 101 is attached to the shaft 95 and is coaxial therewith and the gear 84*a* is formed with an enlarged central aperture by means of which it is freely rotatably mounted on the hub portion. Overlying the upper surface of the gear 84*a* and attached to the hub 101, is a disc 102 having a ringed clutch facing 103 formed of suitable clutching material such as cork, for example, disposed closely adjacent the surface of the gear but normally out of driving engagement therewith.

Disposed beneath the gear 84*a* is a movable metal ring 104 having a clutch facing 105 opposing the clutch facing 103. The ring 104 is carried by a pair of through bolts 106 and 107 which are movable axially when the clutch is energized, as described below, to cause the gear 84*a* to be laterally embraced in a driving connection by the two clutch faces 103 and 105.

The body of the clutch comprises a stationary core or pole assembly 108 attached to the hub 101 and comprising a plurality of stacked laminations. The core 108 formed with a torroidal recess 109 for receiving a winding 110 is connected to a suitable source of electrical energy in a circuit described more fully later. Preferably a shading coil 111 is fitted on only part of the stationary core so that standard transformer laminations may be used for the core.

Carried by the stationary core 108 on either side thereof are a pair of bosses 112 and 113 which are formed with central bores to slidably receive the through bolts 106 and 107, respectively. Disposed beneath the stationary core 108 is a movable core or pole assembly 114 comprising a plurality of stacked laminations and having pole faces spaced from the pole faces of the core 108 by a small air gap. The movable core assembly 114 carries on either side bosses 117 and 118 in which the through bolts 106 and 107, respectively, are anchored by means of opposed lock nuts 118*a* and 118*b*.

The core assembly 114 is formed with a torroidal recess 120 which receives the lower portion of the energizing coil 110.

The movable core 114 is urged downwardly toward its inoperative position by means of a pair of compression springs 121 and 122, respectively, reacting between the movable and stationary cores. The lower limit of movement of the movable core 114 is defined by adjustable stop nuts 123 and 124, which are preferably elastic hex nuts, threaded on the through bolts 106 and 107, respectively, to bear against the flat upper surfaces of the lateral bosses 112 and 113, respectively.

The clutch is designed particularly to provide an unusually high torque capacity related to its size and power consumption. Moreover, the clutch assembly described above affords great simplicity of adjustment of the pole face gaps. It is necessary only to slip a leaf micrometer between the opposed pole faces and make the desired adjustments in the positions of the stop nuts 123 and 124 and the pairs of lock nuts 118*a*, 118*b*. The residual gap when the clutch is energized is adjusted simply by placing the micrometer leaf, which should preferably be a 0.0005 in. thick leaf between the opposed pole faces, pressing the outer or movable core 114 downwardly with a force of 10 lbs. and positioning the nuts 118*a* until the micrometer leaf can be slipped through the gap with only slight frictional resistance. The lower nuts 118*b* are then tightened to clamp the movable core in the proper position. The pole piece gap when the clutch is deenergized is adjusted by placing a micrometer leaf of the proper thickness, say 0.005 in. between the pole pieces and positioning the stop nuts 123, 124 until the micrometer leaf can be slipped through the gap between the pole pieces with only minor frictional resistance. This design, in addition to providing simplicity of adjustment, also allows relatively large tolerances in the grinding of the pole pieces, tolerances of $\pm 0.010$ in. being permissible.

It will be understood that the entire magnetic clutch 84 assembly rotates with the rock shaft 95 and that when the clutch is energized, the gear 84*a* is frictionally clamped to rotate with the rock shaft and clutch.

As described above, the gear 84*a* is in engagement with the gear 85, the latter being mounted on a stub shaft 125 journaled in the base plate B and in a supplementary plate 126 attached to the base plate by suitable spacers 127 for limited axial movement for purposes of changing the gear ratio of the chain. Also mounted on the stub shaft 125 is the gear 86 which drives the gear 87 secured to the shaft 88, which is journaled in the base plate B and spacer plate 126 in a fixed axial position. The shaft 125 also carries a gear 86*a* and the shaft 88*a* carries gear 87*a*, the two being normally out of engagement but adapted to be engaged by sliding the shaft 125 axially upwardly, as viewed in Fig. 11, to a second position as determined by the detent latch 129 which may be received in either of two spaced apart, holding-recesses formed in the shaft. In the upper position of the shaft 125 the gears 86 and 87 are of course disengaged, the gears 84*a* and 85 remaining engaged by virtue of the thickness of the latter. If desired a torsion spring 128 may be provided in the shaft 125 to reduce inertia of the gear train.

The upper end of the shaft 88 carries a double ended radius finger 130 (Figs. 9 and 11) which engages a pin or roller 131 attached to a relatively massive counter weight member 132, which is connected to the input shaft 89 of the counter 82. A tension spring 133 draws the member 132 toward its position as shown in Fig. 9. The limits of rotary movement of the member 132 in both hands of rotation are defined by means of stop pins 132*a* and 132*b* anchored therein eccentrically of the shaft 89. The stop 132*a* defines the limit of clockwise rotation (as viewed in Fig. 9) by engaging a stationary stop 132*c* adjustably mounted in a suitable bracket. The limit of angular movement in a counter-clockwise direction is defined by the stop 132*b* which engages a stationary stop 132*d* also adjustably mounted in a suitable bracket support.

The stroke counter 82 is arranged to record each movement of the input shaft 89 in a clockwise direction over a range not exceeding that defined by the stops. In operation, therefore, it will be understood that energization of the solenoid 81 causes the stub shaft 88 to be rotated in a clockwise direction (the magnetic clutch being energized during this interval). Rotation of the shaft 88 causes the radius finger 130 to drive the inertia member 132 in a counterclockwise direction until the radius finger disengages the roller 131. This releases the inertia member 132 so that the spring 133 may return it in a clockwise direction to its initial position, thereby actuating the counter for one stroke. It will be understood that the amount of rotation of the radius finger 130 depends upon the setting of the previously described calibration micrometer levers and shiftable gears and may be made to vary between a few degrees and 360°.

The return stroke of the solenoid 81 does not appear as a motion in the radius finger 130 for the reason that the magnetic clutch is deenergized during this interval. This timing operation of the clutch will be described more fully below under the sub-heading "VII. — Electrical system for energizing and coordinating the action of the component parts of the instrument."

By virtue of the counting mechanism described above and the use of a stroke counter, such as a Veeder-Root stroke counter which is available commercially, extremely high counting rates are possible. Moreover, the use of the improved linkage described whereby the counter is actuated by the cocked spring 133 results in the isolation of the counter from the actuating solenoid. In this fashion the extremely fast and forceful initial stroke of the solenoid does not actuate the counter, thereby obviating the danger of overspeeding the counter. Since the force which actuates the counter is derived from the spring it may be made constant and can be closely controlled. It will also be understood that the use of the relatively massive counter weight member 132 enables the counter to be operated without the conventional non-overthrow pawl, which is ordinarily provided to prevent the counting wheels from spinning beyond the proper position. Thus the counter can be reset at any time, whereas previously the non-overthrow pawl prevented this operation at all times except when the counting lever was in its normal or non-actuating position. The provision of adequate mass in the counter input linkage makes it possible for the spring 133 to be strong enough reliably to overcome the starting torque of the counter without resulting in such a fast advance of the counting wheels that they overthrow.

A further feature of the counting linkage described above is that the use of the double-ended radius finger 130 reduces the accuracy requirement as to the location of the stud shaft 88 relatively to the axis of the counter input shaft.

The counter 82 is preferably a Veeder-Root stroke counter having five digit wheels each having raised type characters thereon for printing or embossing a record tape with the accumulated count. The printing portion of the system for recording the totalized counts, and which functions interdependently with the counter apparatus described above, will now be described.

IV.—*Printing mechanism for recording accumulated count at preestablished intervals*

Figure 15:
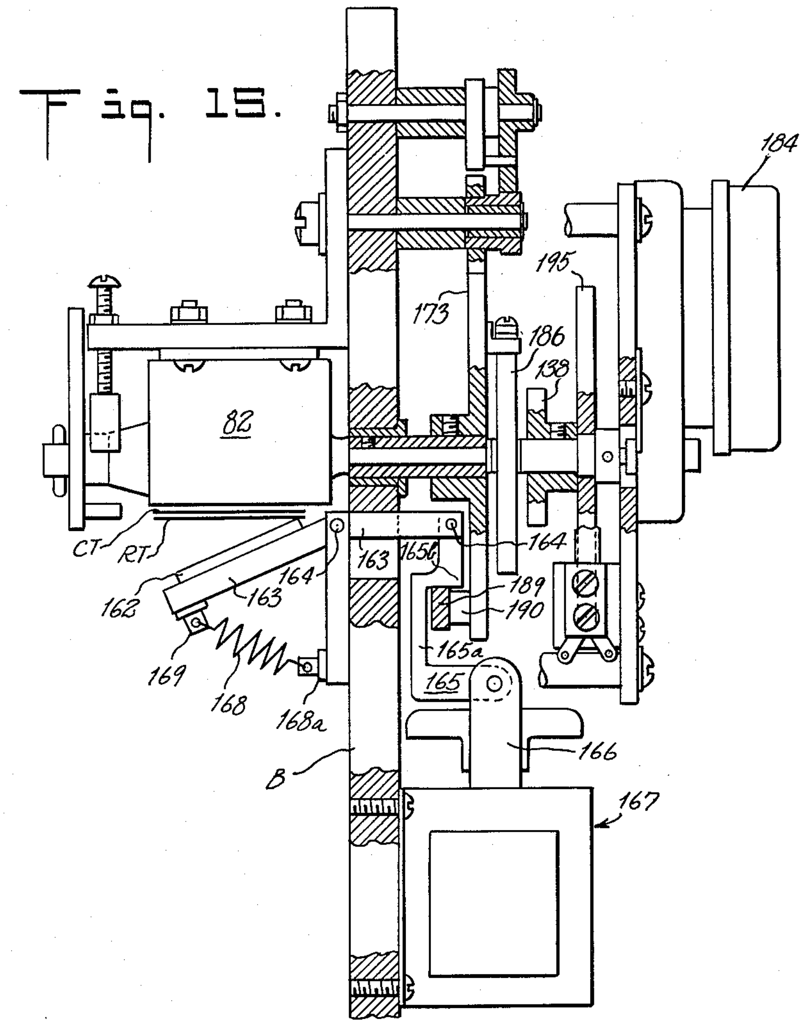
Fig. 15 is a side view partially in section of the printing and reset mechanism as utilized in a preferred embodiment of the invention.

Referring to Figs. 9 and 15, and other figures indicated, the printing system includes a tape supply spool 134 (Fig. 9), a carbon strip supply spool 135 each mounted in the base plate B, and corresponding tape and carbon receiving spools 136 and 137, respectively. Each of the receiving spools 136 and 137, is driven through a common gear train, as best seen in the developed view of Fig. 11, and including a gear 138 mounted on a shaft 185, the primary function of which is described more fully below under the sub-heading "VI.—Mechanism for resetting the counter." The gear 138 engages a gear 139 mounted on a stub shaft 140 journaled in the base plate B, which shaft carries a second gear 141 which drives a gear 142 affixed to a stub shaft 143, also journaled in the base plate B. The shaft also carries, on the opposite surface of the base plate B from the gear train, a record tape drive sprocket 144 having toothed driving rims 144*a* and 144*b* for engaging serrations in the record tape to afford a positive drive therefor. The gear 142 engages a gear 145 secured to a stub shaft 146 to which the record tape receiving spool 136 is detachably secured by a spring detent 136*a* to be rotated therewith. Also driven by the gear train is a shaft 147 (shown in a developed or transparent position in Figure 11) to which the carbon tape receiving spool 137 is detachably secured by a spring detent 137*a*. To provide the desired driving torque between the gear 145 and the receiving spool 136, a compressed dished washer 145*a* may be compressed between the gear 145 and a collar 146*a* secured to the shaft 146. The frictional torque may be varied by varying the degree of compression of the washer 145*a*.

Referring to Fig. 9 the record tape RT and carbon tape CT are shown threaded in the machine, the record tape running from the supply 134 and the carbon tape from the spool 135 over a guide pin or roller 148 across the exposed indicia of the counter 82 and over a guide pin or roller 149. From the pin 149 the carbon strip passes directly to the receiving spool 136 and the record strip passes around guide pins or rollers 148 and 149 to the feed sprocket 144, around a guide pin or roller 150 to the receiving spool 137.

Figure 17:
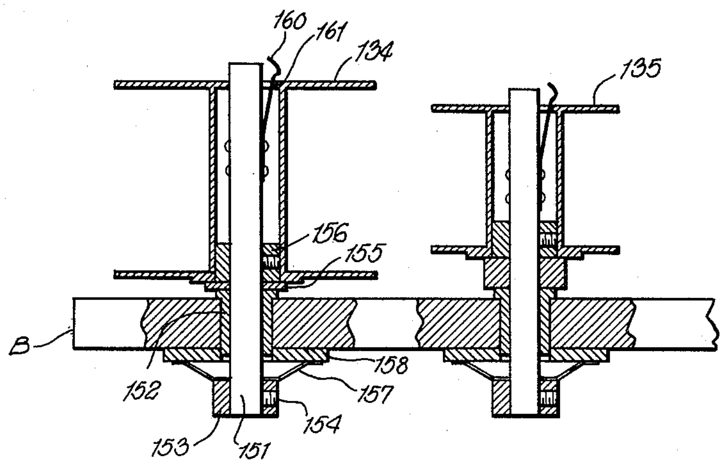
Fig. 17 is a side view partially in cross section showing in detail the mechanical construction of the spools and spool mounting for carrying the record tape means used in the device.

It is preferable that the supply spools 134 and 135, as shown in detail in Fig. 17, have certain frictional resistance to free rotation so as not to spill excessive quantities of tape. To this end an improved spool mounting assembly is provided including a stub shaft 151 journaled in a bearing bushing 152 in the base plate B. To the lower end of the stud shaft 151 is attached a collar 153 secured by a set screw 154, for example, and on the opposite side of the base plate the shaft 151 is fitted with a bearing washer 155 seated on the bushing 152 and against which a collar 156, attached to the shaft 151, bears.

Interposed between the base plate B and the lower collar 153 are a dished spring washer 157 and a bearing plate 158. Thus controlled frictional resistance opposes the free rotation of the stub shaft 151. The spool 134 is positioned on the stub shaft 151 by fitting its open cylindrical hub over the collar 156, with a spring detent finger 160 being received in a radial indentation 161 formed in the upper flange of the spool. The spool 135 is mounted in a similar manner and therefore need not be described in detail.

In order that printed impressions may be formed on the record tape a printing platen 162 (Fig. 15) is provided. This printing platen causes a record to be made on the tape by impacting the record tape and interposed carbon against the raised characters on the counter. The printing platen 162 is carried by a bell crank 163 pivoted to the frame at the base plate B at 164. The inner end of the bell crank 163 is pivotally attached to an offset connecting link 165 which is in turn pivotally attached to an armature 166 of a solenoid assembly 167 hereinafter called the printing solenoid. A tension spring 168 reacting between the outer end 169 of the bell crank 163 and a fixed point 168*a* urges the platen toward its inoperative position and causes the solenoid armature 166 to be returned to its inoperative position after each stroke. Upon energization of the solenoid 167 the platen 162 is swung upwardly to cause the impression on the record tape.

The system is so arranged that at the time an impression is being made the counter is prevented from any movement which would tend to blur the impression, the specific means, both electrical and mechanical, for accomplishing this being described later under the sub-headings VI and VII. The description, immediately following however, is concerned with the timing mechanism which is fundamental to the over-all operation of the instrument.

V.—*Timing mechanism for controlling the printing mechanism*

Referring to Fig. 9 there is shown an improved timer cam assembly 170 having an exposed upper cam disc 170*a* formed on its periphery with a plurality of notches 171*a* which a cam follower 172 may enter, the number of notches presented to the follower being adjustably variable as will be described below. The cam follower controls an electric switch assembly indicated generally at 173 and carried by a bracket 174. Broadly the timer cam controls electrically the printing mechanism described above, and the particular way in which this is done is described more fully in the description in reference to the circuit diagram of Fig. 18 (sub-heading VII).

Figure 18:
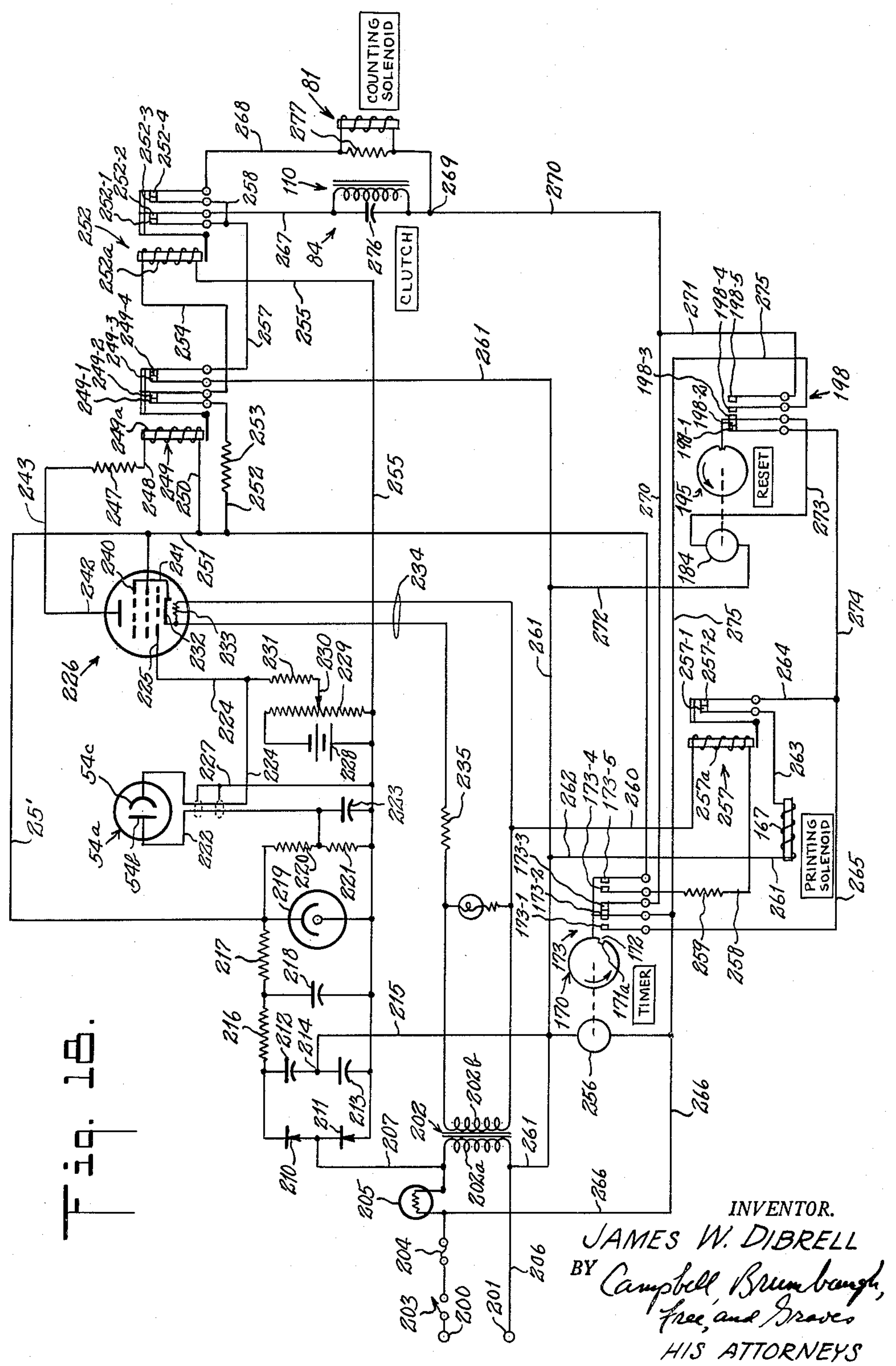
Fig. 18 is a schematic diagram of the electrical circuits provided in accordance with the invention and controlling the mechanical assembly of the preceding figures.

Calibrations 175 may be formed on the face of the cam 170*a* to facilitate, in conjunction with a stationary pointer 176 also supported by the bracket 174, a setting of the cam in synchronism with the minute of the day. In the illustrated embodiment of the invention, therefore, the cam is calibrated in minutes up to sixty and is driven by a conventional one R. P. H. motor 256 (Fig. 18). In order that the instrument may be set into operation during an hour, say twenty-eight minutes past the hour, the entire cam assembly may be turned in adjusting movement on its drive shaft 177 until the "twenty-eight" minute calibration meets the pointer 176. In this fashion the timer cam may conveniently be made to actuate the printer to cause "demand" records to be made exactly on the hour, for example. Moreover, according to the invention the timer may be made to actuate the printer on certain fractional parts of the hour.

In the illustrated embodiment of the invention any one of five different basic timing intervals may be readily selected by controlling the number of notches which the follower 172 may enter. To this end the timer assembly comprises a second notched disc 170*b* which acts as a blocking plate, a portion of which may be seen through the window opening 179 in the exposed disc 170*a*. The two discs are coaxial and are substantially the same diameter and are held together by two screws 180 tapped into the lower disc 170*b* and received in arcuate concentric slots 181 formed in the disc 170*a*. Thus the two discs are for purposes of adjustment relatively rotatable within the limits defined by the slots 181. The lower disc 170*b* is formed with peripheral notches 171*b*, which may be brought into register with the notches 171*a* of the upper disc, the various notches being so arranged angularly that five combinations of pairs of coincident notches may be established to receive the cam follower, and whatever number of pairs of coincident notches are established all will be equally angularly spaced on the periphery of the cam assembly. Thus the cam follower may be made to actuate the switch assembly 173 on the hour or on any one of four other fractional parts thereof.

To indicate the number of actuations per hour which are set up on the cam assembly, appropriate numbers 182 may be formed on the lower disc 170*b* to be viewed through the window 179 in the upper disc corresponding to the number of pairs of coincident notches.

Preferably the cam follower 172 should not operate the switch assembly 173 for more than 30 or 40 seconds so as not to limit unnecessarily the operation of the system. In order to accomplish this the cam follower 172 is designed to fall into the coincident notches 171*a* and 171*b* without imparting any motion to the timing motor. This is accomplished by having the pivot of the follower on a tangent to the edge of the cam, and the cut in the edge of the timing cam, i. e. leading edges of the notches exactly perpendicular to the tangent the follower thus enters the respective notches without giving a forward kick to the cam assembly so that there is no slack to be taken up in the gear train of the one R. P. H. motor which might prolong the operation of the switch. The ride-out slope of the notches is preferably 45°.

VI.—*Mechanism for resetting the counter*

The reset mechanism comes into play after each printing operation and the mechanical components of this portion of the system are best seen in Figs. 11, and 13–16. Broadly the reset mechanism comprises a motor arrangement which may be controlled to turn a reset shaft 183 of the counter mechanism 82 one complete revolution as is normally required to reset a counter to zero.

The reset apparatus includes a conventional one-quarter R. P. M. motor 184 which is connected in an electrical circuit as described more fully under subheading VII below. The motor 184 is carried by the mounting on the plate 126 so that its output shaft 185 is in alignment with the reset shaft 183 of the counter. The driving gear 138 as first mentioned above in the description of the printing apparatus and which drives the tape spools and sprockets 136, 137 and 144 respectively, is mounted on the shaft 185. Also centrally mounted on the shaft 185 is a spiral leaf spring 186 as best seen in Fig. 14 and having its outer end attached to a lug 187 formed on a large gear 188 mounted on the reset shaft 183 of the counter.

Figures 13, 14:
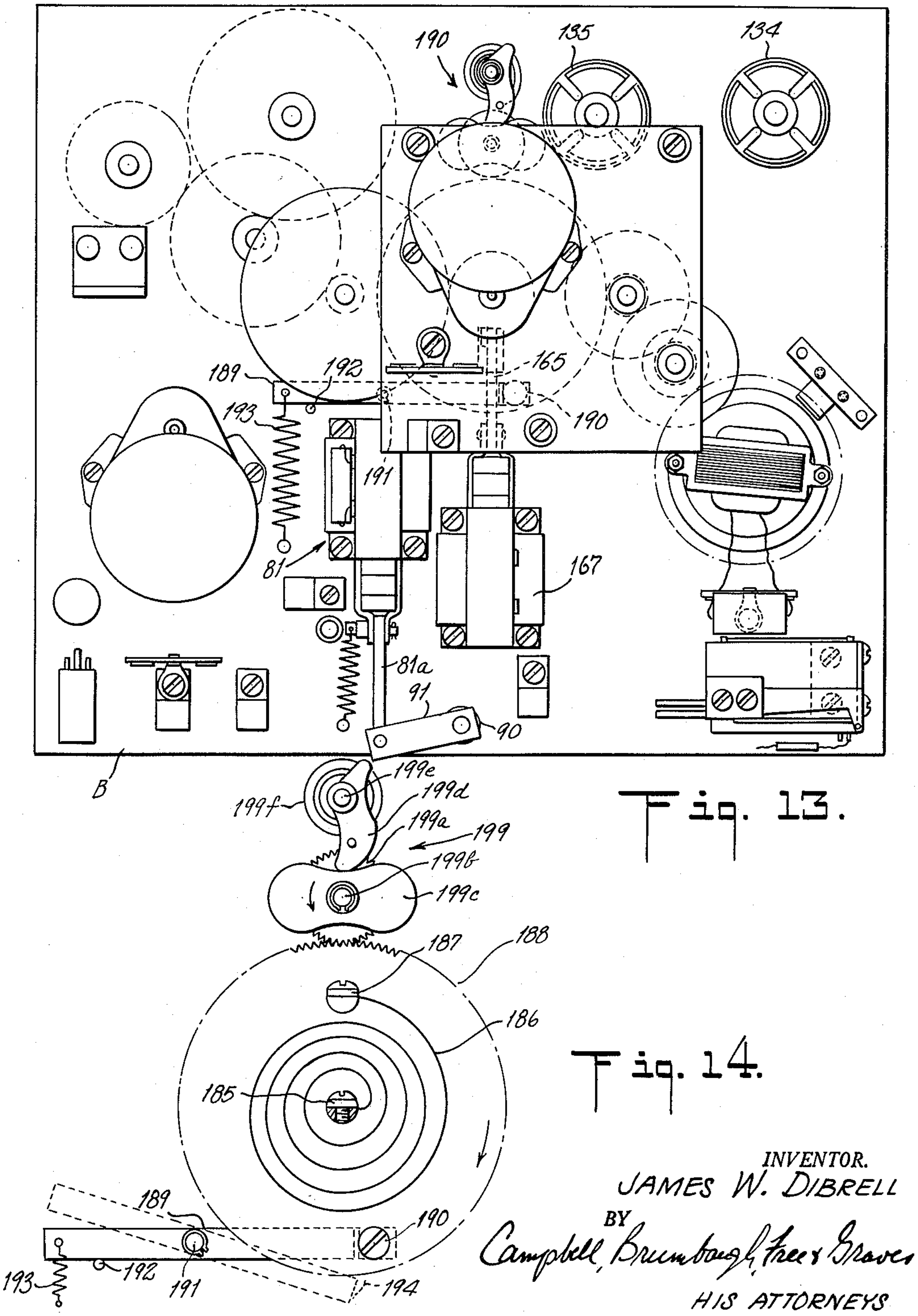
Fig. 13 is a bottom view of the mechanical assembly.
Fig. 14 is a fragmentary view showing the reset spring and cam mechanism incorporated in the reset mechanism.

Prior to each resetting operation and as described more fully below, the reset motor 184 is energized to wind the spring 186 so that it may turn the gear 188 and reset shaft 183 for one complete revolution, the gear 188 however, being constrained against the force of the spring by a pivoted stop lever 189 (as best seen in Figs. 13 and 14). As viewed in Fig. 14 the gear 188 is urged in a clockwise direction by the spring 186 and to prevent its rotation at unauthorized moments a stop 190 is attached to one surface thereof to engage the end of the stop lever 189. The stop lever 189 is pivoted at 191 and is urged in a counterclockwise direction thereabout against a stop pin 192 by a tension spring 193.

It will be recalled that the printing platen 162 is actuated through a linkage including the offset link 165. Referring now to Fig. 15 it will be seen that the link 165 has a shoulder **165*b* which overhangs the stop lever 189, so that when the solenoid 167 is energized to operate the printer, the stop lever 189 will be pulled downwardly or in a clockwise direction out of engagement with the stop 190 on the gear 188. It is at this time that the printing platen is engaging the type characters of the count to record the count, and movement of the reset shaft 183 is now prevented by the shoulder 165*b* which has been pulled downwardly across the face of the stop 190. The spring 186 cannot, therefore, drive the gear 188 in reset movement. But when the solenoid 167 is deenergized (the printing operation being completed) and the link 165 moved upwardly, the stop lever 189 is prevented from reengaging the stop 190 by a small leaf spring (Fig. 14) attached to the butt end of the stop lever. This spring is normally compressed between the butt end of the stop lever 185 and the stop 190, and once the lever is pulled away from the stop the spring snaps outwardly to effectively lengthen the lever 189 so that it cannot swing into alignment with the stop. The gear is then free to partake of one complete revolution (as is required to reset the counter to zero) at which time the stop arm 189 is reengaged by the stop 190**.

Figure 16:
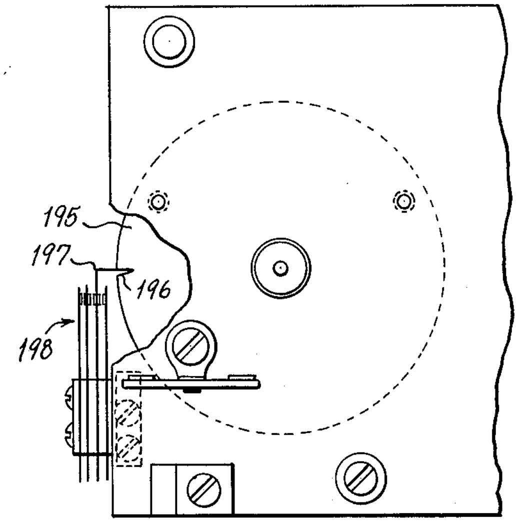
Fig. 16 is a plan view partially broken away of a timer cam and switch assembly utilized particularly in the printing and reset mechanism of Fig. 15.

The shaft 185 of the reset mechanism also carries a circular cam 195 as best seen in Fig. 16. This cam is formed with a single notch 196 which receives a follower 197 of a switch assembly 198. This switch assembly is incorporated in the overall control circuit of Fig. 18 and described below. Essentially the switch 198 acts to control the reset motor 184.

In order to control the speed of reset movement of the gear 188 a verge escapement indicated generally at 199 (Fig. 4) is provided. The verge escapement includes a first gear **199*a* mounted on a shaft 199*b* which carries a cam 199*c* against which an oscillating follower 199*d*, pivoted at 199*e*, is urged by a spiral escapement spring 199*f***, all according to known principles.

As described above, the gear train including gears 138—139, 141—142 of the reeling system for the record tape, is driven from the shaft 185 and as such is under the control of the ¼ R. P. M. motor 184 so that at the time the motor is winding spiral leaf spring 186 the record tape and carbon are moved between the supply and receiving spools to present a clean surface to the counter for recording the next totalized count.

VII.—*Electrical system for energizing and coordinating the action of the component parts of the instrument*

The integrated component parts as described above are energized and controlled by means of an electrical system as shown diagramatically in Fig. 18.

The electrical system may be energized from a 115 volt A. C. supply connected across input terminals 200 and 201. The terminal 200 is connected to one end of a primary winding **202*a* of a stepdown transformer 202 through a series circuit including a starting switch 203, a fuse 204, and a conventional ballast tube 205 which, for example, may be an iron wire in a nitrogen atmosphere serving to regulate the voltage supply to the primary winding 202*a* of the transformer 202. The other end of the primary winding 202*a* is connected by means of a conductor 206 to the input terminal 201. The action of the ballast tube serves to regulate the voltage supply to the primary winding 202*a* in such a way that with a swing in supply voltage from 130 to 100 volts, the voltage induced in the secondary winding 202*b*** will swing from about 90 to 85 volts.

A conductor 207 is connected at one end between the ballast tube 205 and the primary winding **202*a*, and at the other end between a pair of series connected rectifiers 210 and 211** which may be selenium rectifiers, for example, and which operate as a full-wave rectifying network.

Rectifier voltage is impressed across series condensers 212 and 213, and connected to a center tap 214 between the condensers is a conductor 215 which is connected directly to the input terminal 201. In this fashion the condenser-rectifier system operates as a voltage doubler rectifier circuit, the output of which is connected to a filter network including series resistors 216 and 217, and a shunt condenser 218. A voltage regulator tube 219 may be connected in shunt across the output of the filter circuit in order to limit the voltage as applied to the photoelectric tube **54*a*** (Figs. 3 and 4) of the scanner.

A potentiometer system including series connected resistors 220 and 221 is connected in shunt across the voltage regulator tube 219, and the plate supply voltage for the plate electrode **54*b* to the photoelectric tube 54*a* is derived therefrom through a conductor 222. A condenser 223 is connected in parallel with the resistor 221 to afford a time delay so that the voltage regulator tube 219 becomes operative before voltage is applied to the photoelectric tube 54*a*. The cathode electrode 54*c* of the photoelectric tube is connected by means of a conductor 224 to the control grid 225 of a pentode amplifier tube 226. If desired the conductors 222 and 224 connected to the photoelectric tube 54*a* may be shielded by means of the shield connections 227. Also connected to the control grid 225 of the tube 226 is a biasing network including a battery 228 connected in series with a resistor 229 having a slide tap 230 which is connected to the grid lead conductor 224 through a voltage dropping resistor 231. The tube 226 has a cathode 232 and a cathode heater element 233 which is connected across the secondary winding 202*b* of the transformer 202 by means of conduit 234, one conductor of which includes a resistor 235. The suppressor grid 240 of the tube 226 is tied to the cathode by conductor 241**.

The anode or plate electrode 242 of the tube 226 is connected through a circuit including conductor 243, resistor 247 and conductor 248 to one terminal of a relay coil **249*a* of a relay 249. The other terminal of the coil 249*a* is connected to the D. C. supply on the output side of the filter network 216—219 by means of conductors 250 and 251. The relay 249 is provided with two sets of normally closed contacts 249—1, 249—2 and 249—3, 249—4**.

A second relay 252 includes a coil **252*a* which is connected across the D. C. supply by means of a circuit including the conductor 251, a conductor 252 including series resistor 253, normally closed contacts 249—1, 249—2 of the relay 249, a conductor 254, the relay coil 252*a*, and a conductor 255. The relay 252 is provided with two sets of normally closed contacts, 252—1, 252—2 and 252—3, 252—4. Contacts 252—2 and 252—4 are connected by conductors 267 and 268 respectively to the coil 110 of the electromagnetic clutch 84 and the counting solenoid 81. The coil and solenoid are tied together at a junction 269 which is connected by a conductor 270** to the timer and reset switch system as described below.

Also incorporated in the circuit of Fig. 18 are the timer switch assembly 173 and the reset cam switch assembly 198 first mentioned above under sub-headings V and VI, respectively. The timer switch assembly includes normally open contacts 173—1, 173—2, normally closed contacts 173—2, 173—3 and normally open contacts 173—4, 173—5. Each of the enumerated sets of contacts is operated at the same time by the cam 170 and follower 172, the cam being driven by the one R. P. H. motor 256 which is connected directly across the 60 cycle, 115 volt power source. The reset switch assembly 198 includes normally closed contacts 198—1, 198—2, normally open contacts 198—2, 198—3 and 198—4, each set of contacts being actuated by the cam 195 driven by the ¼ R. P. M. motor 184. A coil **257*a* of a third relay 257 is connected at one end of the contact 173—4 of the timer switch assembly 173 through a circuit including conductor 258 and series resistor 259. The other end of the coil is connected to the secondary winding 202*b* of the transformer 202 by the conductor 260**.

The relay 257 includes normally closed contacts 257—1, 257—2 which control the circuit of the printing solenoid 167, the latter being connected in a series circuit traced from the supply terminal 201, the conductor 206, conductors 261 and 262, the solenoid coil 167, conductor 263, contacts 257—1, 257—2 of the relay 257 and conductors 264 and 265 to the contact 173—1 of the timer.

The conductor 270 is connected to contact 173—3 of the timer switch assembly 173 and by a conductor 271 to the contact 189—4 of the reset switch assembly 198. The motor 184 for the reset cam is connected by means of a conductor 272 to the conductor 261 which in turn connects to the supply source terminal 201 from the conductor 206. The other terminal of the motor 184 is joined by a conductor 273 to the contact 198—2 of the switch assembly 198 driven thereby. The contact 198—2 is adapted to engage the contact 198—1 which is connected by means of a conductor 274 and the conductor 265 to the contact 173—1 of the timer relay assembly 173.

The contact 198—3 of the reset switch assembly 198 is connected to the contact 173—2 of the timer cam by a conductor 275 which is in turn connected to the supply source terminal 200 through the conductor 266.

Preferably the magnetic clutch coil 110 is shunted by a capacitor 276 and the counting solenoid 81 is shunted by a resistor 277. The capacitor 276 in parallel with the magnetic clutch and the resistor 277 in parallel with the counting solenoid act respectively to decrease the release time of the clutch and to increase the release time of the solenoid so that the reliability of the counting and multiplying mechanism of the recorder is improved by precluding the possibility of the clutch releasing too slowly that it subtracts from the advancement of the gear train on the return stroke of the solenoid.

*Operation of the system*

Assuming that the instrument is set up adjacent a watt-hour meter and the focusing assembly, described above, is arranged so that the scanning beam is intercepted by the black spot on the conventional rotating disc, the instrument is first set to correspond to the *"k"* factor of the meter. The first adjustment is effected by means of the gear shift mechanism described above with reference to Fig. 11, this comprising the movable shaft 125 which carries a small gear 86 and the large gear **86*a* which may be made to mesh selectively with the corresponding gears 87 and 87*a* on the counter driving shaft 88. By changing these gears the multiplying ratio between the counting solenoid 81 and the counter 82 is varied, so that the counter may be made to record, for example, one watt-hour for each revolution of the disc D in the watt-hour meter. Fine adjustments in the ratio of the counter driving linkage are effected by means of the calibrated levers 92 and 96** (Fig. 9) described above.

Assuming the carbon and record tapes CT and RT to be threaded through the machine between the spools 134, 136 and 135, 137 respectively, the instrument is prepared to operate.

Referring to the circuit diagram of Fig. 18 it will be seen that the photoelectric tube **54*a* is continuously energized by virtue of the light reflected from the periphery of the disc D to the watt-hour meter. When the photoelectric cell 54*a* is energized tube 226 is conducting so that the relay coil 249*a* of the relay 249 is energized and its respective contacts are maintained open. When the black spot of the disc D intercepts the light beam the tube 226 is immediately cut off so that the relay 249 is deenergized and its respective contacts close. In closing contacts 249—1, 249—2 supply a D. C. voltage to the relay coil 252*a* of the relay 252 which is a slow operating relay. The closing of contacts 249—3, 249—4 impresses the A. C. source voltage across the electromagnetic clutch coil 110 and the counting solenoid 81, these through the closed contacts 252—1, 252—2 and 253—3, 252—4 respectively, of the relay 252, the circuit back to the A. C. source being completed through conductor 270, contacts 173—3, 173—2 of the timer cam switch assembly and the conductor 266. This causes the electromagnetic clutch to operate and immediately thereafter the counting solenoid to operate, thereby driving the counter 82 through one or more strokes according to the driving linkage used. It will be understood that the return stroke of the solenoid 81** is not transmitted through operating the driving linkage of the counter due to the fact that the magnetic clutch is deenergized for that portion of the solenoid cycle.

The relay 252 is utilized to insure only that the clutch and counting solenoid are not energized beyond a certain time interval and to this end relay 252 is made slow acting so that its contacts will open after 0.05 second, to open the circuits of the clutch and solenoid. However, if the relay 249 releases before the expiration of that time interval the relay 252 has no function.

Operation of the counter continues intermittently over a time innterval established by the timer cam 170. At the expiration of a preestablished time interval, say one hour, the timer cam 170 which is in operation at all times will cause the switch assembly 173 to be actuated, the follower 172 falling into the notch **171*a* therein. This causes the contacts 173—2, 173—3 to open so that the clutch 84 and solenoid 81 cannot at that instant be energized. This is to protect against the possibility of movement of the counter during the printing operation, which is caused by the closing of contacts 173—4, 173—5 of the timer cam. The printing operation is performed by the printing solenoid 167 which drives the printing platen 162 against the recording tape and counter. The printing solenoid is connected across the A. C. voltage source through the contacts 257—1, 257—2 of the relay 257 which is energized by a D. C. voltage derived from the rectifier circuit and impressed across the coil 257***a* by the closing of the contacts 173—4, 173—5 of the timer cam switch assembly 173.

When the printing platen is released after the printing solenoid 167 is deenergized the reset mechanism is permitted to operate, all as described above under subheading VI. This causes the counter to be reset to zero so that it might receive the counts for the next preestablished time interval. It will be recalled that the reset operation is effected by means of the spiral leaf spring 186 (Fig. 14) under the control of the verge escapement 199. In the meantime it is necessary to rewind the spring. When the printing operation first begins the contacts 198—1 and 198—2 of the reset cam switch assembly 198 are closed so that the motor 184 is energized through a circuit including the now closed timer contacts 173—1, 173—2. When the reset cam begins to rotate contacts 198—2, 198—3 close so that the reset motor may operate for one complete rotation of the cam 195 after which the follower of the switch assembly 198 falls into the notch in the cam 195 to open the circuit to the motor 184. The fact that the contacts 198—1, 198—2 close at this time does not reestablish the circuit of the motor 184 through the contatcs 173—1, 173—2 of the timer cam for the reason that the latter will by this time have been opened.

Thus it will be understood that demand records may be made continuously and automatically at preestablished time intervals.

It will be understood that the invention has been described herein with reference to a particular form of instrument adapted to operate in conjunction with watthour meters and that without departing from the scope of the invention an instrument might be made according to the invention to count and record numerous other types of aperiodic events over preestablished time intervals. Moreover various component parts of the instrument may be changed within the scope of the invention which should not be limited therefor, save as defined in the following claims.

What I claim is:

1. A frequency distribution recorder comprising input means for receiving signals indicative of aperiodic events to be counted and recorded, counter means responsive to said input signals for totalizing the signals received, timing means, printing means including record receiving means controlled by said timing means, said printing means being periodically actuated to record the count of said counter on said record receiving means, means for rendering said counter means inoperative during the printing operation, reset means to reset the counter to a starting point after each printing operation, and means controlled by said printing means for rendering said reset means inoperative during the printing operation, the last said means including a releasable stop for inactivating the reset means, a stop release member movable with the printing means, and a stop on said release member to maintain the reset member inactive during the printing operation.

2. A frequency distribution recorder comprising input terminals adapted to receive a series of random electrical signals indicative of discrete events to be counted and recorded over successive preestablished time intervals, amplifying means connected to receive said input signals, relay means, counter means connected to be energized under the control of said relay means, whereby the counter means is normally actuated by each input signal received, timing means having a periodic control action, recording means connected to be actuated by said timing means to record the count of said counter means at the end of each preestablished time interval, reset means for resetting the counter means to a starting point controlled by said timing means, means controlled by said recording means for rendering said counter reset means inoperative, and means controlled by said timing means for rendering said counter means inoperative to totalize input signals during the printing operation.

3. A frequency distribution recorder for observing, counting and recording discrete events, comprising a counter having a resetting shaft, spring motor means connected to drive said resetting shaft, releasable lock means for maintaining the resetting shaft in a given position against the action of said spring motor, a timer, means controlled by the timer for periodically releasing said lock means, electromotive means connected to energize said spring motor, and means controlled by the timer for periodically energizing said electromotive means.

4. Apparatus as set forth in claim 3 including verge escapement means connected to said resetting shaft for governing the resetting movement thereof.

5. Apparatus as set forth in claim 3, switch means controlled by said electromotive means, and said means controlled by the timer for energizing the electromotive means including an electrical circuit having the said switch means connected in series therewith.

6. A system as set forth in claim 3, including a record tape adapted to receive indicia representative of cumulative counts, reeling means for feeding the record tape through the system, and operative driving connections between said resetting shaft and said reeling means for shifting the record tape during movement of the resetting shaft.

7. A frequency distribution recorder comprising a counter having an input shaft and a resetting shaft, spring motor means for driving said resetting shaft, releasable stop means for holding said resetting shaft in a fixed position, electromotive means connected to energize said spring motor, a cam movable with said electromotive means and switch means controlled by said cam, a timer having an electrical switch associated therewith, a source of electrical energy and electrical circuit means connecting the electromotive means to said source of electrical energy including the respective switches of the timer and the cam.

8. A frequency distribution recorder comprising a counter having a reset shaft adapted to reset said counter to zero, spring means connected to drive said shaft in the direction of resetting, motive means for winding said spring, releasable stop means for holding said reset shaft against unauthorized rotary movement, means for disengaging said stop means to permit said spring to drive the reset shaft, and resilient means for resetting said stop means to block movement of said reset shaft after one rotation.

9. A frequency distribution recorder for counting and recording discrete events comprising a counter having a movable control member, recording means operable in conjunction with said counter to record the count totalized over a preestablished interval, said recording means including a printing member mounted for movement between inoperative and operative positions to record the count, a first stop movable with said counter control member, and a second stop movable with said printing member to engage said first stop to block movement of said control member when the printing member is in its operative position.

10. Apparatus as set forth in claim 9, including a third stop normally in engagement with said first stop normally to block movement of said control member when the printing member is in its inoperative position, and means for preventing reengagement of said second and third stops immediately after the printing operation, thereby to permit said control member to operate for a limited period of time.

11. A frequency distribution recorder for counting and recording discrete events comprising a counter including a rotary resetting member for periodically setting the counter to a starting point, recording means operable in conjunction with said counter to record the count totalized over a preestablished interval, said recording means including a printing member movable between inoperative and operative position to record the count, a first stop rotatable with said resetting member, a second stop movable with said printing member and adapted to engage the first stop during the printing operation to prevent movement of said resetting member at that time, a third stop normally in engagement with the first stop for blocking movement of said resetting member when the printing member is inoperative, means responsive to actuation of said printing member for temporarily disengaging said first and third stops, a blocking member carried by one of said stops for preventing reengagement of the first and third stops immediately after the printing operation, thereby to permit said resetting member to rotate, and means for positioning the third stop to be engaged by the first stop after one complete rotation of the resetting member.

12. Apparatus as set forth in claim 11, said third stop comprising a pivotally mounted link spring biased toward a position to be engaged by the first stop, and said blocking member comprising a spring element carried by said link and interposed between the link and the first stop, said link being adapted to be pivoted out of engagement with said first stop by the actuation of said printing member.

13. Apparatus as set forth in claim 12, said printing member comprising a printing platen pivotally mounted to be carried into engagement with said counter, electromagnetic means for actuating said printing platen, and a connecting link interposed between the printing platen and the electromagnetic means, said connecting link having a shoulder comprising said second stop which is adapted to engage said first stop and to disengage the first and third stops during actuation of the printing platen.

14. A frequency distribution recorder comprising a mounting assembly adapted to be secured to a watt-hour meter, a source of directed light and a photoelectric tube and means for movably mounting the source and tube so that light from the source may be reflected from the rotatable disc of the watt-hour meter to the photoelectric tube, whereby the photoelectric tube is activated by changes in the amount of reflected light from the disc, a counter, means movable upon activation of the photoelectric tube for operating the counter to accumulate activations of the photoelectric tube, means including printing means for recording accumulated counts of said counter, timing means, means responsive to said timer for actuating the printing means to record the total count of the counter, means responsive to said timer for resetting the counter after each printing operation, and means controlled by the printing means for preventing actuation of the resetting means during the printing operation.

15. A frequency distribution recorder comprising input terminal means for receiving electrical signals representing events to be counted and recorded, a relay connected to be actuated in response to the electrical signals, electromagnetic counter means and a source of electrical energy, circuit means including a switch operated by said relay for connecting the counter to the source of electrical energy, electromagnetically operated printing means for periodically recording the count accumulated by the counter, a timer and switch means controlled thereby, means forming a circuit connecting the printing means to the source of electrical energy, said circuit including the switch means of said timer, an electromagnetically operated reset device for driving the counter to a starting condition, circuit means including the switch means of the timer for connecting the reset device to the source of electrical energy, and switch means operated by the reset device for opening the circuit which energizes the counter.

16. A frequency distribution recorder comprising a counter and electromagnetic means for actuating said counter, terminal means for receiving input signals indicative of events to be counted, an amplifier connected to receive and amplify said input signals, a first relay connected to be controlled by the output of said amplifier and including first and second switch means, a second relay and electrical circuit means including said first switch means for energizing said second relay, said second relay including switch means, a source of electrical energy and electrical circuit means including the switch means of the second relay for connecting the counter to said source of power, an electromagnetically actuated clutch comprising a portion of said means for actuating the counter, an electrical circuit including the switch means of the second relay for energizing said clutch, timer means including first, second and third switches, means connecting the first switch in series with the switch means of the second relay, a third relay and switch means controlled thereby, means connecting said second timer switch in series with the third relay, electromagnetically actuated printing mechanism connected to be energized through a circuit including the switch means of said third relay and the third switch of said timer means, said printing mechanism being adapted to be energized periodically under the control of said timer means, reset control apparatus having first, second and third switches, and means connecting the first switch in shunt across the second switch of said timer means and means connecting the first reset switch in series with the first switch of said timer.

17. A frequency distribution recorder system as set forth in claim 16 including motive means for operating said reset control apparatus and electrical circuit means for energizing said motive means including in series said second switch of the reset control apparatus.

18. A frequency distribution recorder as set forth in claim 16 including a capacitor connected in shunt across said electromagnetic clutch, and a resistor connected in shunt across said electromagnetic means for actuating the counter, whereby said clutch is deenergized at a rate exceeding the rate of deenergization of said electromagnetic means.

References Cited in the file of this patent

UNITED STATES PATENTS

| | | |
|---|---|---|
| 2,065,048 | Burnside | Dec. 22, 1936 |
| 2,082,941 | Burnside | June 8, 1937 |
| 2,278,409 | Armbruster | Apr. 7, 1942 |
| 2,318,633 | Ries | May 11, 1943 |
| 2,333,306 | Fishter | Nov. 2, 1943 |
| 2,387,613 | Ryba | Oct. 23, 1945 |
| 2,380,231 | Giffen | July 10, 1945 |
| 2,385,399 | Brauham | Sept. 25, 1945 |
| 2,392,467 | Engel et al. | Jan. 8, 1946 |
| 2,426,942 | Miller | Sept. 2, 1947 |
| 2,484,113 | Mumma | Oct. 11, 1949 |
| 2,507,297 | Bouget | May 9, 1950 |
| 2,525,176 | Lindgren | Oct. 10, 1950 |
| 2,553,843 | Bickel et al. | May 22, 1951 |
| 2,553,846 | Clemens | May 22, 1951 |
| 2,564,322 | Brosseau | Aug. 14, 1951 |
| 2,567,942 | Kass | Sept. 18, 1951 |
| 2,571,061 | Reynolds | Oct. 9, 1951 |